United States Patent Office 3,728,214
Patented Apr. 17, 1973

3,728,214
POLYAMINE-ACRYLAMIDE-POLYALDEHYDE RESINS HAVING UTILITY AS WET AND DRY STRENGTHENING AGENTS IN PAPERMAKING
Herbert H. Espy, Wilmington, Del., assignor to Hercules Incorporated, Wilmington, Del.
No Drawing. Filed Mar. 12, 1971, Ser. No. 123,863
Int. Cl. D21h *3/58;* C08g *9/02*
U.S. Cl. 162—167                17 Claims

ABSTRACT OF THE DISCLOSURE

Disclosed is a novel polyamine-acrylamide-polyaldehyde resin useful in the papermaking art to enhance the wet and dry strength of paper.

---

This invention relates to wet strength resins, the process of incorporating them into paper and the paper so treated.

Various resins which impart wet strength to paper are known in the art. However, most of the prior art resins are of the permanent type, i.e., paper treated with them retains its wet strength long after immersion in water, which is desirable in packaging materials but presents a disposal problem. A few resins are known which impart temporary wet strength and would thus be suitable for sanitary or disposable paper uses, but each of them suffers from one or more serious drawbacks. For example, their wet strength efficiency is seriously decreased by alum, they are easily attacked by mold and slime, they can only be prepared as dilute suspensions or they must be applied to preformed paper because they are not substantive to pulp.

It is an object of this invention to provide resins which impart both dry and wet strength to paper.

It is a further object of this invention to provide wet strength resins such that paper treated with them loses strength on prolonged immersion in water such as on disposal in sanitary systems, and facilitates the handling of broke in the paper mill.

It is a further object of this invention to provide resins which impart their ultimate wet strength on drying alone without curing and are substantive to pulp without sizing.

It is a further object of this invention to provide wet strength resins which can be prepared in high solids concentrations.

It is a further object of this invention to provide wet strength resins which are not easily attacked by mold and slime growth.

It is a further object of this invention to provide wet strength resins which are more stable towards gelation on storage.

It is a further object of this invention to provide wet strength resins whose efficiency is not seriously reduced by alum.

Now in accordance with this invention these objectives and many others have been achieved by preparing wet strength resins from a polyamine, an acrylamide and a polyaldehyde.

The wet strength resins of this invention are prepared by (1) reacting a polyamine, containing primary and/or secondary amine groups, with an acrylamide and (2) reacting the resulting adduct with an organic compound containing at least two free aldehyde groups.

The polyamines which can be used to prepare the polyamine-acrylamide-polyaldehyde resins of this invention will be selected from the polyalkylene polyamines having the general formula

and

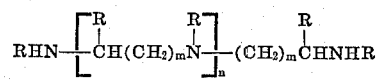

where $m$ is an integer from 1 to 5, $n$ is at least 1, each R independently of each other is selected from the group consisting of hydrogen and lower alkyl radicals, and the poly(vinylamines) having the general formula

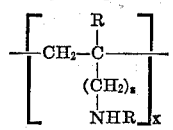

where $z$ is 0 or 1, $x$ is at least 2 and R is as defined above. It will be understood that the term poly(vinylamines) used herein is meant to include poly(allylamines).

Typical polyalkylene polyamines are diethylenetriamine, dipropylenetriamine, triethylenetetraamine, tetraethylenepentaamine, pentaethylenehexaamine, bis(3 - aminopropyl)amine, bis(3 - aminopropyl)ethylenediamine, bis(2-aminoethyl)-1,3-diaminopropane, bis(2 - aminopropyl)-1,3 - diaminopropane, $N^1,N^3$-dimethyl-diethylenetriamine, tris(2-aminoethyl)amine, and polyethyleneimine. Typical poly(vinylamines) are poly(vinylamine), poly(vinylmethylamine), poly(vinylethylamine), poly(vinyl-n-butylamine), polyallyl(amine), poly(isopropenylamine), poly metha(llylamine), poly($\beta$-chloroallylamine), poly(ethallylamine) and poly($\alpha$-ethylvinylamine).

As stated above, in the preparation of the resins of this invention the polyamine is reacted with an acrylamide, including substituted acrylamides such as methacrylamide, $\alpha$-ethylacrylamide, and crotonamide. Most preferably, a sufficient amount of the acrylamide will be used to react with substantially all of the amine groups in the polyamine. In practice an excess of acrylamide helps to drive the carbamidoethylation of the amines to substantial completion in a reasonable time. The reaction between the polyamine and acrylamide can be carried out at any temperature between about 20° C. and the boiling point of the reaction mixture at the solids concentration used and will generally be carried out in a diluent. Temperatures between about 60° C. and about 110° C. are most preferred. A high pH during the reaction is favored since this frees the amine groups from their salts.

The final reaction in the preparation of the wet strength resins of this invention is between the polyamine—acrylamide adduct and an organic compound containing at least two free aldehyde groups (i.e. a polyaldehyde). Typical polyaldehydes which may be used in the final reaction are glyoxal, malonic aldehyde, succinic aldehyde, glutaraldehyde, adipic aldehyde, 2-hydroxyadipaldehyde pimelic aldehyde, suberic aldehyde, azelaic aldehyde, sebacic aldehyde, maleic aldehyde, fumaric aldehyde, dialdehyde starch, polyacrolein, phthalaldehyde, isophthalaldehyde, terephthalaldehyde, 1,3,5-triformylbenzene, and 1,4-diformylcyclohexane. This reaction is generally carried out at a pH of from about 5 to about 10 and a temperature in the range of from about 20 to about 80° C. Mole ratios of polyaldehyde to acrylamide in the polyamine-acrylamide adduct will be between about 0.05 and about 5.0, most preferably between about 0.1 to about 3.0. The resulting wet strength resin will have a Brookfield viscosity of from about 5 cps. to about 200 cps. as determined on a Brookfield Model LVF viscometer using a No. 1 spindle rotating at 60 or 12 r.p.m.

When using the wet strength resins of this invention in papermaking, they can be added at any time before, during or after the paper is formed. For example, the resin can be added before or after the refining of the pulp, at the fan pump or head box, or by spraying on the wet web. The resin can also be added to preformed paper by tub sizing or spraying on the dried paper sheets. In most commerical papermaking it will be preferred to add the resin at the fan pump or head box in the form of an aqueous solution of up to 15% solids. Various amounts of the resin can be used. When used to impart web strength, the amount of resin added will be sufficient to result in a paper containing from about 0.05% to about 5% by weight based on the weight of the paper. The actual amount for any specific purpose can be easily determined by one skilled in the art. As stated above, no heat curing is required with the resins of the instant invention since they develop their optimum strength on normal drying. They can be added to paper over a wide range of pH values. However, best results are obtained by adding the resin to the paper at an acid pH of from about 1 to about 8 most preferably from about 3 to about 6.

Other ingredients can be used in conjunction with the wet strength resins of this invention. The additives or ingredients commonly used in papermaking can be used here also as for example alum, rosin size, coating colors, mineral fillers, starch, casein, etc. The presence of other ingredients is not essential to this invention and excellent results are achieved when using only the wet strength resins of this invention.

It will be obvious to those skilled in the art that the wet strength resins of this invention can be incorporated into various types of paper such as kraft paper, sulfite paper, semichemical paper, etc. both bleached and unbleached. While the resins can be used in various types of paper, their advantages will be most sought in paper toweling or paper tissues such as toilet and facial tissues.

The following examples will serve to illustrate the invention, parts and percentages being by weight unless otherwise indicated.

EXAMPLE 1

This example shows the preparation of and use in papermaking of a typical wet strength resin in accordance with this invention.

To a solution of 43 parts of a polyethyleneimine, having a molecular weight of approximately 30,000, in 212 parts of water is added 71.0 parts of acrylamide. The mixture is heated at 70–75° C. for 2 hours and then cooled. One hundred and sixty-three parts of the resulting solution of polyethyleneimine-acrylamide adduct is diluted with 108.5 parts of water, adjusted to a pH of 7.5 with sulfuric acid and then treated with 72.5 parts of 40% aqueous glyoxal. The resulting mixture is heated to 50° C. and held between 50 and 55° C. for 130 minutes during which time the viscosity (measured on a sample cooled to 25° C.) reaches a Gardner-Holdt value of about L. The resulting wet strength resin solution is diluted with about 517 parts of water cooled to 25° C. and the pH adjusted to about 5.0 with sulfuric acid. The resulting solution contains about 10% solids. After storage for 90 days at room temperature a sample of the wet strength resin solution shows no signs of mold or slime.

Rayonier bleached kraft pulp is between in a cycle beater to a Schopper-Riegler freeness of 750 cc. Portions of this pulp, adjusted to a pH of 4.5 with sulfuric acid, are added to the proportioner of a Noble-Wood handsheet forming machine. Samples of the above wet strength resin are added to the proportioner in amounts of 0.5%, 1%, and 2% resin solids by weight of pulp solids. The pulp is then formed into handsheets of about 40 pounds per 3,000 square foot basis weight and dried for one minute at a temperature of 110° C. A control handsheet is prepared exactly as described above except it contains no wet strength resin. The resulting handsheets after conditioning at a temperature of 75° F. and 50% relative humidity for over 24 hours are tested for dry tensile strength and wet tensile strength after soaking for 10 seconds in distilled water. The wet tensile strength and dry tensile strength is tabulated below:

| Percentage of resin contained in paper | Tensile strength, lbs./in. width | |
|---|---|---|
| | Dry | Wet |
| None (control) | 17.8 | 0.56 |
| 0.5 | 23.6 | 4.19 |
| 1.0 | 23.8 | 5.78 |
| 2.0 | 23.8 | 6.66 |

EXAMPLE 2

This example shows the preparation and use of another typical wet strength resin in accordance with this invention.

A mixture of 47.2 parts of tetraethylenepentamine, 171.6 parts of water and 124.4 parts of acrylamide is heated for 2 hours at a temperature of 100° C. under reflux. After cooling the yield is a 49.4% solids solution. Sixty-nine and one half parts of the above tetraethylenepentamine-acrylamide adduct solution is adjusted to pH 7.5 with 9.66 normal (37%) sulfuric acid. To the thus acidified solution is added 50.8 parts of 40% aqueous glyoxal and the resulting mixture heated to 50 to 55° C. for 117 minutes, during which the viscosity of the mixture reaches the pre-gel stage. The resin solution is diluted with 426.7 parts of water and adjusted to a pH of 5.0 with sulfuric acid. The resulting wet strength resin solution contains about 10.4% total solids. After storage for 90 days at room temperature a sample of the wet strength resin solution shows no signs of mold or slime.

Bleached kraft paper is prepared using the above wet strength resin as described in Example 1. Samples of the thus prepared paper are tested for dry and wet strength also as described in Example 1. The wet strength and dry strength is tabulated below.

| Percentage of resin contained in paper | Tensile strength, lbs./in. width | |
|---|---|---|
| | Dry | Wet |
| None (control) | 19.0 | 0.54 |
| 0.25 | 19.4 | 0.84 |
| 0.5 | 19.2 | 1.20 |
| 1.0 | 20.0 | 1.70 |
| 2.0 | 20.8 | 2.30 |

EXAMPLE 3

This example shows the preparation and use of a wet strength resin similar to the resin of Example 1 except for the substitution of glutaraldehyde for glyoxal.

One hundred and sixty-three parts of the polyethyleneimine-acrylamide adduct solution described in Example 1 is diluted with 55 parts of water, adjusted to a pH of 7.5 with sulfuric acid and then treated with 200 parts of 25% aqueous glutaraldehyde solution. The resulting mixture is heated at 40–55° C. for 2 hours. The resulting wet strength resin solution is diluted with approximately 640 parts of water and its pH adjusted to 5.0 with sulfuric acid. The resulting product solution containins approximately 10.4% solids.

When incorporated in bleached kraft paper as described in Example 2 the resin gives dry and wet strength improvements similar to those produced by the polyethyleneimine-acrylamide-glyoxal resin of Example 1.

EXAMPLE 4

This example shows the preparation and use of a wet strength resin prepared from poly(vinylamine).

To 3.9 parts of poly(vinylamine hydrochloride), having a molecular weight of around 50,000, dissolved in 70 parts of water, is added 5.85 parts of 30% aqueous NaOH. To the thus neutralized solution is added 7.1 parts of acrylamide. The resulting mixture is heated at 90° C. for 3 hours and then cooled. Forty-seven parts of the resulting poly(vinylamine)-acrylamide adduct solution is adjusted to pH 7.5 with sulfuric acid and then treated with 7.8 parts of 40% aqueous glyoxal solution. The resulting mixture is heated to 50° C. and maintained at this temperature for 56 minutes, during which the viscosity increased to the pre-gel stage. The resulting wet strength resin solution is diluted with approximately 50 parts of water and its pH adjusted to 5.0 with sulfuric acid. The resulting product contains approximately 8.2% solids. After storage for 90 days at room temperature, a sample of the product shows no signs of mold or slime.

Bleached kraft paper is prepared from the above-described wet strength resin as described in Example 1. Wet and dry strength tests are carried out also as described in Example 1. The results of these tests are tabulated below.

| Percentage of resin contained in paper | Tensile strength, lbs./in. width | |
|---|---|---|
| | Dry | Wet |
| None (control) | 18.8 | 0.38 |
| 0.5 | 22.2 | 3.12 |
| 1.0 | 24.0 | 3.98 |
| 2.0 | 23.2 | 4.56 |

EXAMPLE 5

This example shows the preparation and use of a wet strength resin prepared from poly(vinylmethylamine).

To 11.4 parts of poly(vinylmethylamine), having a molecular weight of approximately 12,000, dissolved in a mixture of 45 parts water and 35 parts ethanol is added 14.2 parts of acrylamide. The resulting mixture is heated to 80° C. for 2 hours, then stripped at 50–55° C. under vacuum until 41 parts of solvent is removed. The residue is diluted with 107 parts of water, adjusted to pH 7.5 7.5 with sulfuric acid and then treated with 29 parts of 40% aqueous glyoxal solution. The resulting mixture is heated at 50° C. for 30 minutes, then diluted with 172 parts of water and its pH adjusted to 5.0 with sulfuric acid. The resulting poly(vinylmethylamine)-acrylamide-glyoxal resin solution contains approximately 10% solids. After storage for 90 days at room temperature, a sample of the product shows no signs of mold or slime.

When incorporated in bleached kraft paper as described in Example 1, the resin gives dry and wet strength improvements similar to those produced by the resin of Example 4.

EXAMPLE 6

This example shows the preparation and use of a wet strength resin prepared from poly(allylamine).

A solution of 11.4 parts of poly(allylamine), having a molecular weight of approximately 400, in a mixture of 50 parts water and 50 parts ethanol is treated with 28.4 parts of acrylamide, and heated to 80° C. for 2 hours. The resulting solution is stripped at 50–55° C. under vacuum until 60 parts of solvent is evaporated. The residue is diluted with 153 parts of water adjusted to pH 7.5 with sulfuric acid. The resulting solution is treated with 58.1 parts of 40% aqueous glyoxal solution and then heated to 50° C. for 30 minutes. The resulting wet strength resin solution is diluted with 338 parts of water and its pH adjusted to 5.1 with sulfuric acid. The product solution contains approximately 10% solids. After storage for 90 days at room temperature a sample of the product shows no signs of mold or slime.

When incorporated in bleached kraft paper as described in Example 1, the resin gives dry and wet strength improvements similar to those produced by the resin of Example 4.

EXAMPLE 7

This example shows the preparation and use of a wet strength resin prepared from vinylamine dimer.

A mixture of 8.8 parts of vinylamine dimer, 100 parts of water and 28.5 parts of acrylamide is heated at 90° C. for 2 hours and then cooled. The resulting solution is adjusted to pH 7.5, treated with 58.1 parts of 40% aqueous glyoxal and heated to 50° C. for about 25 minutes. The resulting wet strength resin solution is diluted to 10% solids with 410 parts of water and adjusted to pH 5 with sulfuric acid. After storage for 90 days at room temperature, a sample of the product shows no signs of mold or slime.

When incorporated in bleached kraft paper as described in Example 1, the resin gives dry and wet strength improvements similar to those produced by the resin of Example 2.

EXAMPLE 8

This example shows the preparation and use of a wet strength resin prepared from poly(isopropenylamine) and methacrylamide.

To a solution of 5.71 parts of poly(isopropenylamine) is a mixture of 40 parts water and 40 parts ethanol is added 18.6 parts of methacrylamide. The resulting mixture is heated for 7 hours at 80° C., then distilled at 50–55° C. at reduced pressure until 49.1 parts of solvent is removed. The residue is adjusted to pH 7.5 with sulfuric acid and then treated with 40% aqueous glyoxal. The resulting mixture is heated at 50° C. for 20 minutes, then diluted with 257 parts of water and adjusted to pH 5 with sulfuric acid. The resulting wet strength resin contains approximately 10% solids and is free of mold or slime after storage for 90 days at room temperature.

When incorporated in bleached kraft paper as described in Example 1, the resin gives dry and wet strength improvements similar to those produced by the resin of Example 4.

What I claim and desire to protect by Letters Patent is:

1. A polyamine-acrylamide-polyaldehyde resin prepared by reacting
   (1) a polyamide selected from the polyalkylene polyamines having the general formula selected from

and

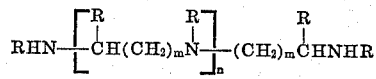

where each R independently of each other is selected from hydrogen and lower alkyl radicals, $m$ is an integer from 1 to 5 and $n$ is at least 1 and the poly(vinylamines) having the general formula

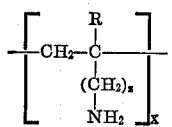

where $z$ is 0 or 1 and $x$ is at least 2 and R is as defined above with
   (2) an amount of unsaturated amide, selected from the group consisting of acrylamide and lower alkyl substituted acrylamides, sufficient to react with substantially all of the amine groups in the polyamine and
   (3) reacting the resulting polyamine-unsaturated amide adduct with from about 0.05 to about 5.0 moles of an organic compound containing at least two free aldehyde groups per mole of unsaturated amide present in said adduct.

2. The product of claim 1 wherein the polyamine is tetraethylenepentamine.

3. The product of claim 1 wherein the polyamine is a polyethyleneimine.

4. The product of claim 1 wherein the polyamine is a poly(vinylamine).

5. The product of claim 1 wherein the organic compound containing at least two free aldehyde groups is glyoxal.

6. The product of claim 1 wherein the organic compound containing at least two free aldehyde groups is glutaraldehyde.

7. The product of claim 1 wherein the acrylamide is a lower alkyl substituted acrylamide.

8. The process of preparing a polyamide-acrylamide-polyaldehyde resin which comprises the steps of (1) reacting a polyamine selected from the polyalkylene polyamines having the general formula selected from

and

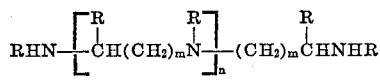

where each R independently of each other is selected from hydrogen and lower alkyl radicals, $m$ is an integer from 1 to 5 and $n$ is at least 1 and the poly(vinylamines) having the general formula

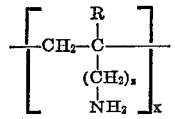

where $z$ is 0 or 1 and $x$ is at least 2 and R is as defined above with (2) an amount of unsaturated amide, selected from the group consisting of acrylamide and lower alkyl substituted acrylamides, sufficient to react with substantially all of the amine groups in the polyamine and (3) reacting the resulting polyamine-unsaturated amide adduct with from about 0.05 to about 5.0 moles of an organic compound containing at least two free aldehyde groups per mole of unsaturated amide present in said adduct.

9. The process of claim 8 wherein the polyamine is tetraethylenepentaamine.

10. The process of claim 8 wherein the polyamine is a polyethyleneimine.

11. The process of claim 8 wherein the polyamine is a poly(vinylamine).

12. The process of claim 8 wherein the organic compound containing at least two free aldehyde groups is glyoxal.

13. The process of claim 8 wherein the unsaturated amide is acrylamide.

14. A paper treating composition comprising an aqueous solution of up to 15 percent solids by weight based on the weight of the water of a polyamine-acrylamide-polyaldehyde resin described in claim 1.

15. Paper treated with from about 0.05% to 5% by weight based on the weight of the paper of a polyamine-acrylamide-polyaldehyde resin described in claim 1 to impart wet strength.

16. The process of treating paper to impart wet strength which comprises treating said paper with from about 0.05% to about 5% by weight based on the weight of the paper of a polyamine-acrylamide-polyaldehyde resin described in claim 1 and allowing the treated paper to dry.

17. The process of claim 16 wherein said treating is conducted during the formation of said paper.

References Cited
UNITED STATES PATENTS

| | | | |
|---|---|---|---|
| 3,607,622 | 9/1971 | Espy | 162—167 |
| 3,556,932 | 1/1971 | Coscia et al. | 162—166 |
| 2,886,557 | 5/1959 | Talet | 260—72 R |
| 3,594,272 | 7/1971 | Shen et al. | 260—72 R |
| 3,234,076 | 2/1966 | Goldsmith | 162—168 |

S. LEON BASHORE, Primary Examiner

F. FREI, Assistant Examiner

U.S. Cl. X.R.

162—164; 260—17.3 R, 29.4 R, 29.4 VA, 72 R